(12) United States Patent
Hicks

(10) Patent No.: US 10,334,840 B2
(45) Date of Patent: Jul. 2, 2019

(54) BIRD ANTI-COLLISION WINDOW FILM

(71) Applicant: Artscape Inc., Portland, OR (US)

(72) Inventor: Thomas Hicks, Portland, OR (US)

(73) Assignee: ARTSCAPE INC., Portland, OR (US)

( * ) Notice: Subject to any disclaimer, the term of this patent is extended or adjusted under 35 U.S.C. 154(b) by 315 days.

(21) Appl. No.: 14/803,001

(22) Filed: Jul. 17, 2015

(65) Prior Publication Data

US 2016/0041319 A1   Feb. 11, 2016

Related U.S. Application Data

(60) Continuation-in-part of application No. 14/623,830, filed on Feb. 17, 2015, now abandoned, which is a
(Continued)

(51) Int. Cl.
*G02B 5/20* (2006.01)
*G02B 5/22* (2006.01)
(Continued)

(52) U.S. Cl.
CPC ............ *A01M 29/08* (2013.01); *B32B 7/02* (2013.01); *B32B 7/12* (2013.01); *B32B 27/08* (2013.01);
(Continued)

(58) Field of Classification Search
CPC .......... Y10T 428/24975; G02B 5/0278; G02B 5/0242; G02B 5/0221; G02B 5/223;
(Continued)

(56) References Cited

U.S. PATENT DOCUMENTS 2,013,472 A   9/1935   McCarthy
3,515,619 A   6/1970   Barnette
(Continued)

FOREIGN PATENT DOCUMENTS

EP   1748884     2/2007
GB   1381478 A   1/1975
(Continued)

OTHER PUBLICATIONS

Sixteen (16) sheets of digital photographs showing Artscape's Versailles decorative window film. At least as early as 2002.
(Continued)

*Primary Examiner* — Nancy R Johnson
(74) *Attorney, Agent, or Firm* — Schwabe Williamson & Wyatt (57) ABSTRACT

A bird anti-collision film prevents birds from flying into windows by disrupting visible habitat reflections that might appear on the outside of the windows. The anti-collision film blocks and/or absorbs light that may normally be reflected by a window and also actively scatters, and fluoresces light creating an active light disturbance. The disrupted light includes a light range highly visible by many birds but only partially visible by humans. A textured surface in combination with a fluorescent dye in the anti-collision film increases the intensity and range of the light disturbance. The anti-collision film may be attached to the inside of a window providing the unique advantages of easy inside window installation and insulation from external weather conditions.

25 Claims, 9 Drawing Sheets

Related U.S. Application Data continuation-in-part of application No. 11/833,942, filed on Aug. 3, 2007, now abandoned, which is a division of application No. 10/846,807, filed on May 13, 2004, now abandoned.

(51) Int. Cl.
| | |
|---|---|
| A01M 29/08 | (2011.01) |
| B32B 7/02 | (2019.01) |
| B32B 27/08 | (2006.01) |
| B32B 27/18 | (2006.01) |
| B32B 27/30 | (2006.01) |
| B44C 1/10 | (2006.01) |
| B44F 1/02 | (2006.01) |
| E06B 7/28 | (2006.01) |
| E06B 9/24 | (2006.01) |
| G02B 5/02 | (2006.01) |
| B32B 7/12 | (2006.01) |

(52) U.S. Cl.
CPC ............ *B32B 27/18* (2013.01); *B32B 27/306* (2013.01); *B44C 1/10* (2013.01); *B44F 1/02* (2013.01); *E06B 7/28* (2013.01); *E06B 9/24* (2013.01); *G02B 5/0221* (2013.01); *G02B 5/0242* (2013.01); *G02B 5/0278* (2013.01); *G02B 5/223* (2013.01); *B32B 2307/4026* (2013.01); *B32B 2307/41* (2013.01); *B32B 2307/412* (2013.01); *B32B 2307/414* (2013.01); *B32B 2307/51* (2013.01); *B32B 2307/71* (2013.01); *B32B 2307/712* (2013.01); *B32B 2419/00* (2013.01); *Y10T 428/24975* (2015.01)

(58) Field of Classification Search
CPC ......... B32B 7/02; B32B 27/306; B32B 27/18; B32B 27/08; B32B 17/10247; B32B 17/10; B32B 2419/00; B32B 2307/4026; B32B 2307/51; B32B 2307/71; B44C 1/10; E06B 7/28; E06B 9/24; B44F 1/02
See application file for complete search history.

(56) References Cited

U.S. PATENT DOCUMENTS

| | | |
|---|---|---|
| 3,533,889 A | 10/1970 | Powell |
| 3,562,941 A | 2/1971 | Boden |
| 3,815,263 A | 6/1974 | Oberwager |
| 3,915,087 A | 10/1975 | Tiemann |
| 3,931,425 A | 1/1976 | Kuroda |
| 4,070,259 A | 1/1978 | De Poortere et al. |
| 4,070,781 A | 1/1978 | Sauer |
| 4,078,492 A | 3/1978 | Levy et al. |
| 4,127,689 A | 11/1978 | Holt |
| 4,225,369 A | 9/1980 | Felchlin |
| 4,231,634 A | 11/1980 | Gantz et al. |
| 4,283,451 A | 8/1981 | Abrahami |
| 4,302,260 A | 11/1981 | Meltzer |
| 4,312,688 A | 1/1982 | Brodis et al. |
| 4,320,174 A | 3/1982 | Rabinovitch et al. |
| 4,407,525 A | 10/1983 | Hoppe |
| 4,457,961 A | 7/1984 | Nakazawa et al. |
| 4,528,232 A | 7/1985 | Cliffe |
| 4,684,675 A | 8/1987 | Collier |
| 4,749,222 A | 6/1988 | Idland |
| 4,791,745 A | 12/1988 | Pohn |
| 4,863,782 A | 9/1989 | Rang |
| 4,960,671 A | 10/1990 | Dickinson |
| 5,021,278 A | 6/1991 | Short |
| 5,059,245 A | 10/1991 | Phillips et al. |
| 5,144,328 A | 9/1992 | Blake et al. |
| 5,202,180 A | 4/1993 | Watts |
| 5,217,791 A | 6/1993 | Fujita et al. |
| 5,258,214 A | 11/1993 | Cooledge et al. |
| 5,273,796 A | 12/1993 | Elbing et al. |
| 5,289,351 A | 2/1994 | Kashima et al. |
| 5,577,947 A | 11/1996 | Malloy et al. |
| 5,594,191 A | 1/1997 | Epstein et al. |
| 5,617,790 A | 4/1997 | Chmielnik |
| 5,672,413 A | 9/1997 | Taylor et al. |
| 5,707,684 A | 1/1998 | Hayes et al. |
| 5,735,590 A | 4/1998 | Kashima et al. |
| 5,829,789 A | 11/1998 | Treleaven et al. |
| 5,858,139 A | 1/1999 | Ouderkirk |
| 5,871,571 A | 2/1999 | Rendall et al. |
| 5,887,393 A | 3/1999 | Vanark et al. |
| 5,916,450 A | 6/1999 | Muggli et al. |
| 5,925,453 A | 7/1999 | Kase |
| 5,940,215 A | 8/1999 | Rudisill et al. |
| 5,959,067 A | 9/1999 | Bakker et al. |
| 5,972,453 A | 10/1999 | Akiwa et al. |
| 6,030,002 A | 2/2000 | Charley et al. |
| 6,054,208 A | 4/2000 | Rega et al. |
| 6,060,157 A | 5/2000 | LaPerre |
| 6,136,127 A | 10/2000 | DeBastiani |
| 6,166,852 A | 12/2000 | Miro |
| 6,231,183 B1 | 5/2001 | Dillon |
| 6,280,063 B1 | 8/2001 | Fong et al. |
| 6,358,598 B1 | 3/2002 | Hicks |
| 6,633,666 B2 | 10/2003 | Gill et al. |
| 6,721,102 B2 | 4/2004 | Bourdelais et al. |
| 6,900,941 B2 | 5/2005 | Kaminsky et al. |
| 6,997,566 B2 | 2/2006 | Hannington |
| 7,048,307 B1 | 5/2006 | Scarbrough et al. |
| 7,468,203 B2 | 12/2008 | Hicks |
| 7,615,276 B1 | 11/2009 | Goodson |
| 9,278,577 B2 | 3/2016 | Hicks |
| 2002/0039632 A1 | 4/2002 | Hicks |
| 2003/0108724 A1 | 6/2003 | Hicks |
| 2003/0205895 A1 | 11/2003 | Scarbrough et al. |
| 2004/0213974 A1 | 10/2004 | Hicks et al. |
| 2005/0255292 A1 | 11/2005 | Hicks et al. |
| 2006/0019074 A1 | 1/2006 | Scarbrough et al. |
| 2006/0270298 A1 | 11/2006 | Kuhn et al. |
| 2007/0275167 A1 | 11/2007 | Hicks |
| 2009/0068408 A1 | 3/2009 | Hicks |
| 2010/0018644 A1 | 1/2010 | Sacks et al. |
| 2014/0037838 A1* | 2/2014 | Thottathil ............... C09D 5/004 427/157 |
| 2015/0140270 A1 | 5/2015 | Hicks |
| 2015/0160385 A1 | 6/2015 | Hicks |

FOREIGN PATENT DOCUMENTS

| | | |
|---|---|---|
| GB | GB 2324381 A | 10/1998 |
| JP | 11048395 A | 2/1999 |
| JP | 2006273332 | 10/2006 |
| WO | WO/2003/023505 | 3/2003 |
| WO | WO/2003/055692 | 7/2003 |
| WO | WO/2005/113234 | 1/2005 |
| WO | WO 2005/027696 | 3/2005 |
| WO | WO/2008/086436 | 7/2008 |

OTHER PUBLICATIONS

"Borders for Kids" advertisement, 1996.
"Development Timeline," Tom Hick, 1996-1999.
"Etch Art, Inc." advertisement, date unknown.
"Self-clinging vinyl blocks harmful UV rays," undated advertisement for Solar Stat self-adhering vinyl film product (Silvohome Product).
Advertisement for Solar Stat, date unknown.
SFC Listing of Related Cases for 1505-0032.
SFC Listing of Related Cases for 1505-0101.
International Preliminary Report on Patentablility and Written Opinion for PCT/US08/050658; dated Apr. 9, 2008.
International Search Report for PCT/US/08/050658; dated Apr. 9, 2009.
International Preliminary Report on Patentablility and Written Opinion for PCT/US05/016351; dated Jun. 29, 2006.

(56) References Cited

OTHER PUBLICATIONS

International Search Report for PCT/US05/016351; dated Jun. 29, 2006.
European Patent Office; Supplemental Search Report EP 05749806.5; dated May 10, 2010; 4 pgs.

* cited by examiner

BIRD ANTI-COLLISION WINDOW FILM

This application is a continuation in part of U.S. patent application Ser. No. 14/623,830, filed Feb. 17, 2015 entitled BIRD ANTI-COLLISION WINDOW FILM which is a continuation in part of U.S. patent application Ser. No. 11/833,942, filed Aug. 3, 2007, entitled TEXTURED WINDOW FILM, which is a divisional of U.S. patent application Ser. No. 10/846,807, filed May 13, 2004, entitled TEXTURED WINDOW FILM, which are all herein incorporated by reference in their entirety.

TECHNICAL FIELD

This invention relates generally to bird anti-collision window films.

BACKGROUND OF THE INVENTION

Buildings are using larger windows. For example, the outside of many buildings are made up almost entirely of windows. Many single family homes, as well as high rise condominiums, have large widows or sliding glass doors that take up most of the surrounding wall space. The windows may reflect light from surrounding outside habitat. The birds are fooled by the reflections and fly into the windows causing injury or death. The number of birds that collide into windows has reached epidemic levels with bird mortality rates in the United States due to window collisions reported at around 1,200,000,000 per year.

To prevent bird collisions, some building owners have placed decals on the outside of the windows to disrupt the reflected images. However, these decals have limited success preventing bird collisions. Chances of even moderate success require attaching a large number of the decals to the outside of the window.

The outside of windows may have restricted access. For example, windows may not open or may be located high above the ground. Applying decals on the outside of these windows is difficult, expensive, and/or dangerous. Large numbers of decals placed on the outside of windows also reduce overall building aesthetics and have reduced operating life due to exposure to outside weather conditions.

DESCRIPTION OF THE PREFERRED EMBODIMENTS

Figure 1:
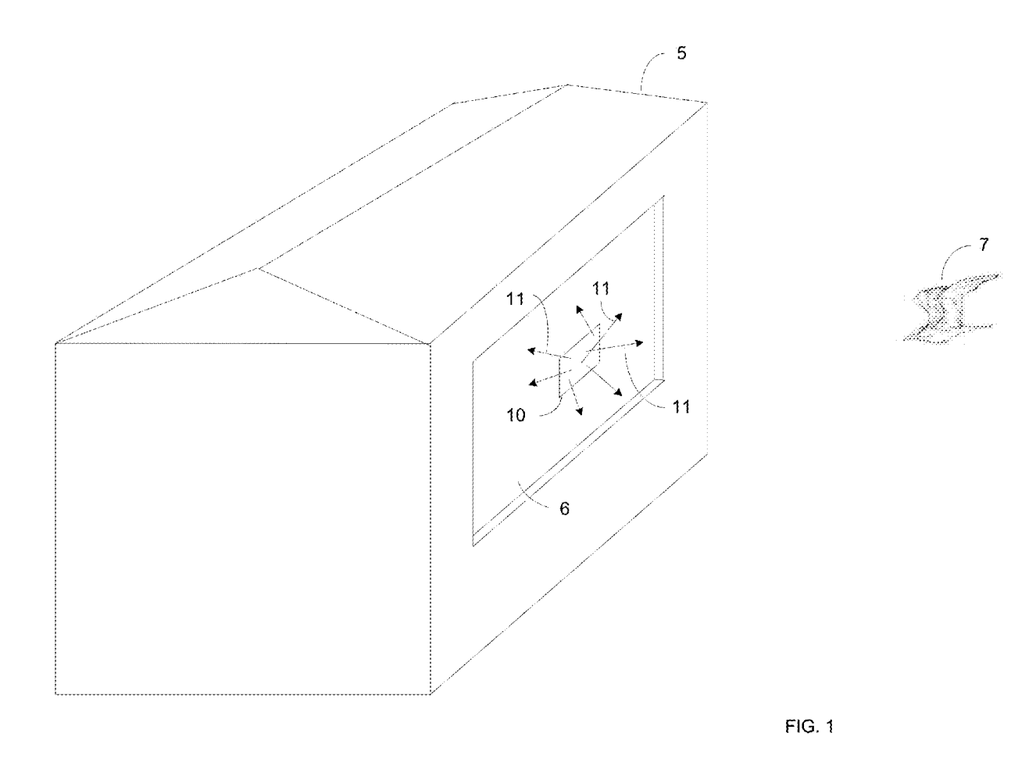
FIG. 1 is a perspective view of a bird anti-collision window film

FIG. 1 shows a bird anti-collision film 10 attached to the inside of a window 6 installed in a building 5. This is just one example and window 6 may comprise a sliding glass door or any other transparent material located in any home, building, or any other structure. Window 6 may reflect images of habitat that exist outside of building 5. For example, the light reflected by window 6 may appear as part of landscape, trees, mountains, etc. A bird 7 flying in the direction of building 5 may mistake the reflection as part of the outside habitat and unintentionally fly into window 6.

Anti-collision film 10 either reflects or absorbs light coming from outside of building 5 and emits light back out through window 6, thereby, disrupting the image that a bird would see 11. Disrupted light 11 includes, but is not limited to, light absorbed and then emitted back out by anti-collision film 10. For example, anti-collision film 10 may absorb a range of ultra-violet (UV) light that is visible by bird 7. The UV light absorption reduces some of the reflection normally visible by bird 7. Anti-collision film 10 then reemits light as fluorescence at a wavelength range believed to be highly visible by bird 7.

The fluorescence output from anti-collision film 10 is within a wavelength fully visible by bird 7 but only partially visible by humans. Disrupted light 11 therefore creates a substantial visual disruption for bird 7 while at the same time creates a much less noticeable visual disruption to humans. The result is that a relatively small amount of anti-collision film 10 substantially reduces bird collisions and at the same time is hardly noticeable to humans thus minimally impacting the overall aesthetics of window 6.

A building owner may attach anti-collision film 10 to the inside of window 6 providing the additional advantages of increased reflective light disruption and active fluorescing while also providing easy application and insulation from external weather conditions. The decreased reflection and increased absorption/emission of light 11 means a smaller amount of anti-collision film 10 can be used compared with conventional window decals.

For example, anti-collision film 10 may comprise a 4 inch by 4 inch square and one or only a few of the relatively small square anti-collision films 10 may provide enough visual reflective disruption for a relatively large window 6. The reduced number and/or size of anti-collision films 10 further improve aesthetics on the inside and outside of window 5 while also reducing cost.

Figure 2:
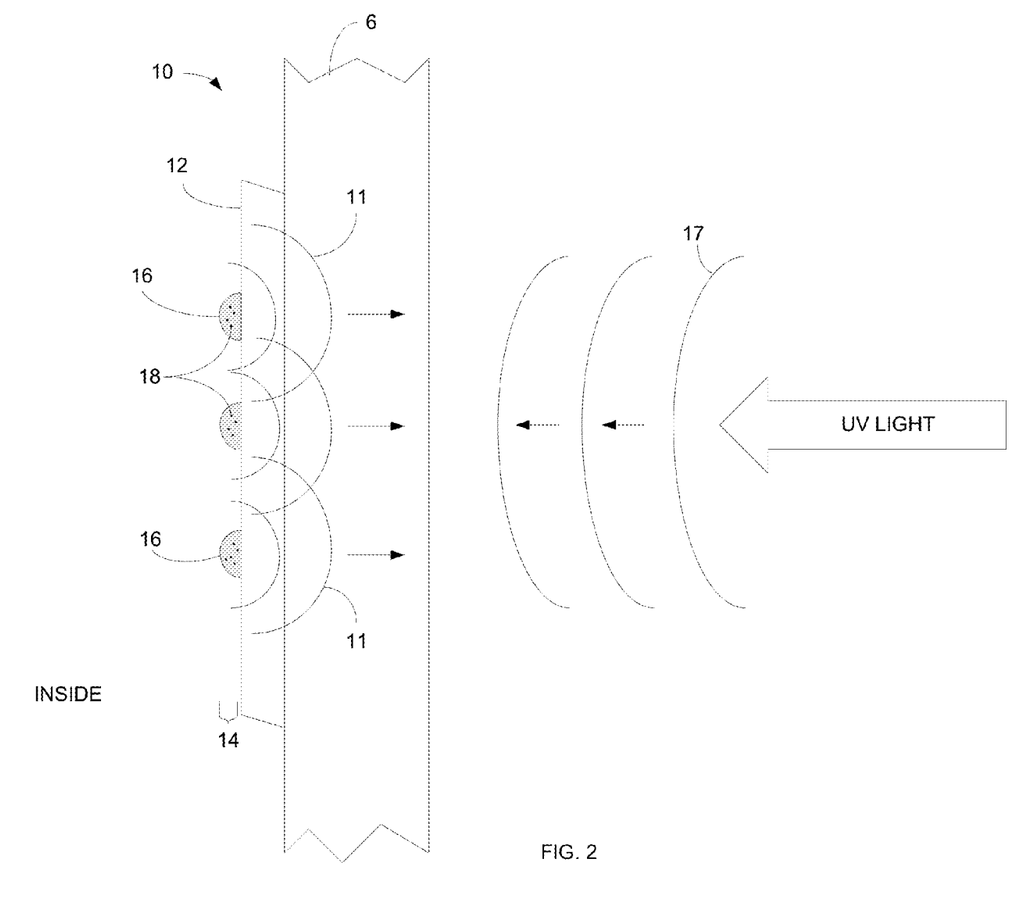
FIG. 2 is side sectional view of the bird anti-collision window film.

FIG. 2 shows a section view of anti-collision film 10 in more detail. Film 10 includes a first relatively flat base layer 12 and a second textured layer 14 that in one example comprises different patterns of bumps or other protuberances 16, In one example, bumps 16 in textured layer 14 include a first relatively flat surface contacting base layer 12 and curved or partially round side and back surfaces extending up from base layer 12.

In one example, base layer 12 may comprise a polymeric film and textured layer 14 may comprise a layer of resin applied over polymeric film 12. In another example, base layer 12 may comprise a layer of resin applied over a polymeric film and textured layer 14 may comprise a second layer of resin applied over resin layer 12. These are just examples and anti-collision film 10 may include additional combinations of resin and polymeric films.

In one example, a fluorescent dye 18 is mixed in with the resin of textured layer 14. The description below refers to additive 18 as a fluorescent dye but may include any material, such as an optical brightener, that absorbs and then fluoresces light. As mentioned above, fluorescent dye 18 may absorb a first UV wavelength range and fluoresce at a second wavelength range. UV light 17 absorbed by fluorescent dye 18 may be within a visual light range of birds reducing a certain amount of UV reflection from window 6. Fluorescing light 11 emitted by fluorescent dye 18 is believed to further disrupt other light reflected from window 6.

One example of fluorescent dye is Uvitex OB NSICH221 manufactured by Nazdar Ink Technologies, 8501 Hedge Lane Terrace, Shawnee, Kans. 66227. Another example of fluorescent dye 18 is Benetex® OB Plus made by Mayzo, Inc. 3935 Lakefield Court, Suwanee, Ga. 30024. The chemical name is 2,2'-(2,5-thiophenediyl)bis(5-tert-butylbenzoxazole) with empirical formula $C_{26}H_{26}N_2O_2S$. In one example, 4-15% fluorescent dye 18 by weight in the resin used for textured layer 14 have been shown to create disrupted light 11 that significantly reduces bird collisions. In one example, fluorescent dye 18 has a 93% transmittance for a peak wavelength of around 440 nanometers (NM).

Another type of fluorescent dye 18 mixed with textured layer 14 or mixed with any of the other layers of anti-collision film 10 is:

2,5-Bis(5-tert-butyl-2 benzoxazolyl)thiophene (CAS Number: 7128-64-5 Product Number: B1544), Product Number B1554, manufactured by Tokyo Chemical Industry Co., Ltd (TCI) America, 9211 North Harborzate Street, Portland, Oreg. 97203.

It is believed that bumps 16 in textured layer 14 may further increase the absorption of light 17. For example, the additional surface area provided the flat front surface and rounded side and rear surfaces of bumps 16 may expose the fluorescent dye 18 to more light 17 from multiple different directions. For example, bumps 16 may radially emit fluorescence and light 11 out from anti-collision film 10 at multiple different directions and angles. The wider emission pattern of light 11 may create a larger more noticeable disruption in reflections from window 6.

Figure 3:
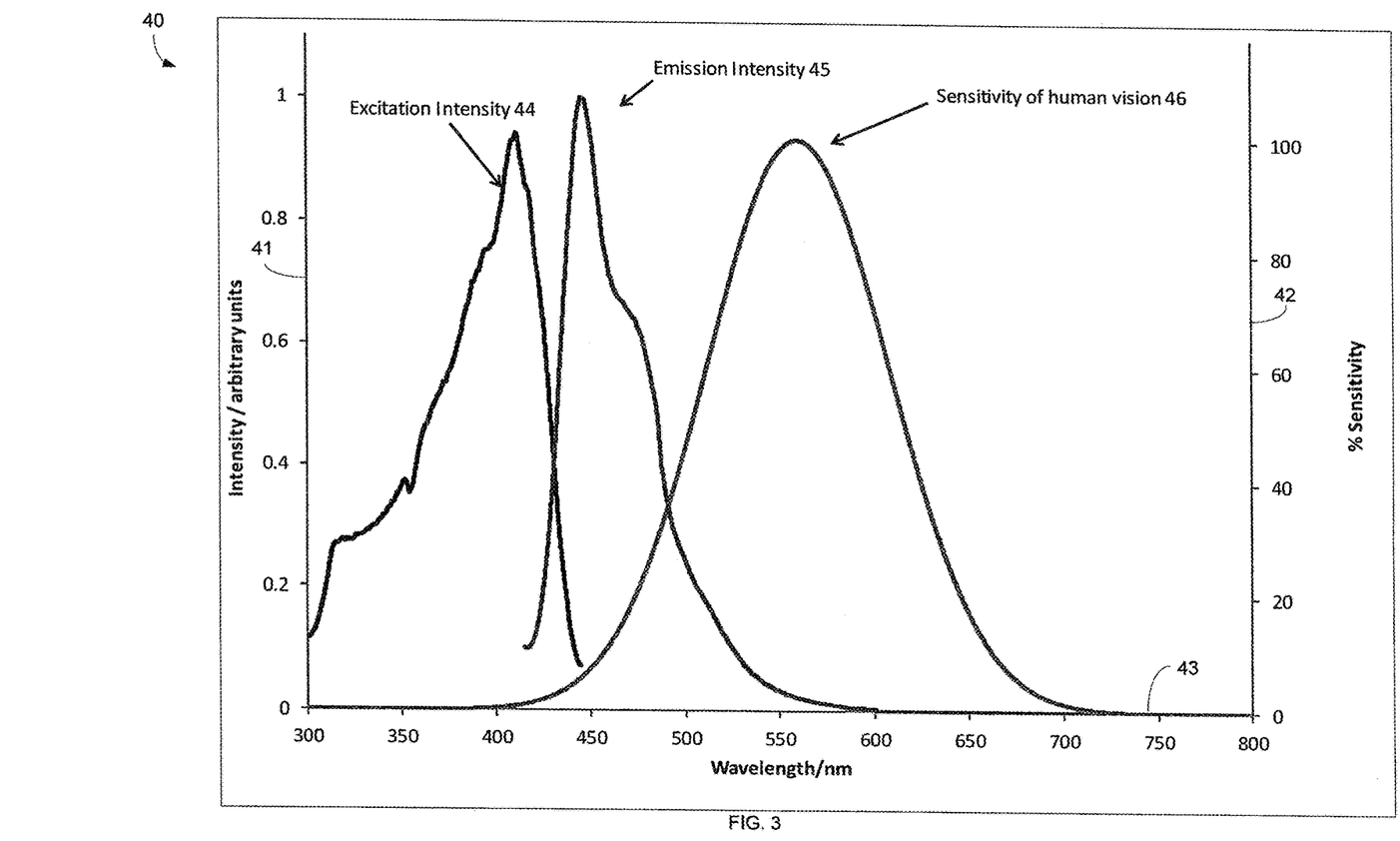
FIG. 3 is a graph showing light wavelength ranges absorbed and emitted by the bird anti collision film.

FIG. 3 shows spectroscopic data for a range of light absorbed (excitation) and the light emitted (emission) by the anti-collision film. Graph 40 includes a horizontal axis 43 that represents different light wavelengths. A first vertical axis 41 represents a relative intensity of light absorbed, emitted, or reflected by the anti-collision film. A second vertical axis 42 represents a percentage of human sensitivity to different light wavelengths.

Curve 46 shows that humans are sensitive to a light range between around 400 nanometers (nm) and 725 nm. For example, humans only slightly detect light between 400 nm and 450 nm and highly detect light centered around 550 nm.

Curve 44 shows the excitation intensity (light absorbance) and curve 45 shows e emission intensity (fluorescence) of anti-collision film 10 described above. The peak at around 410 nm in curve 44 represents a peak light absorption by anti-collision film 10 for a particular fluorescent dye and the peak around 450 nm in curve 45 is the intensity of light emitted by anti-collision film 10.

Bird vision extends well into the ultraviolet range and is near maximum sensitivity at 450 nm whereas human vision as shown by curve 46 is only about 7% of maximum sensitivity at 450 nm. To birds, film 10 may present a bright blue glow spreading out in all directions across the window surface disrupting the reflection of habitat from the associated window. However, to humans, anti-collision film 10 may only appear as a faint white pattern on the window surface creating only marginally noticeable emission intensity 45.

Figure 4:
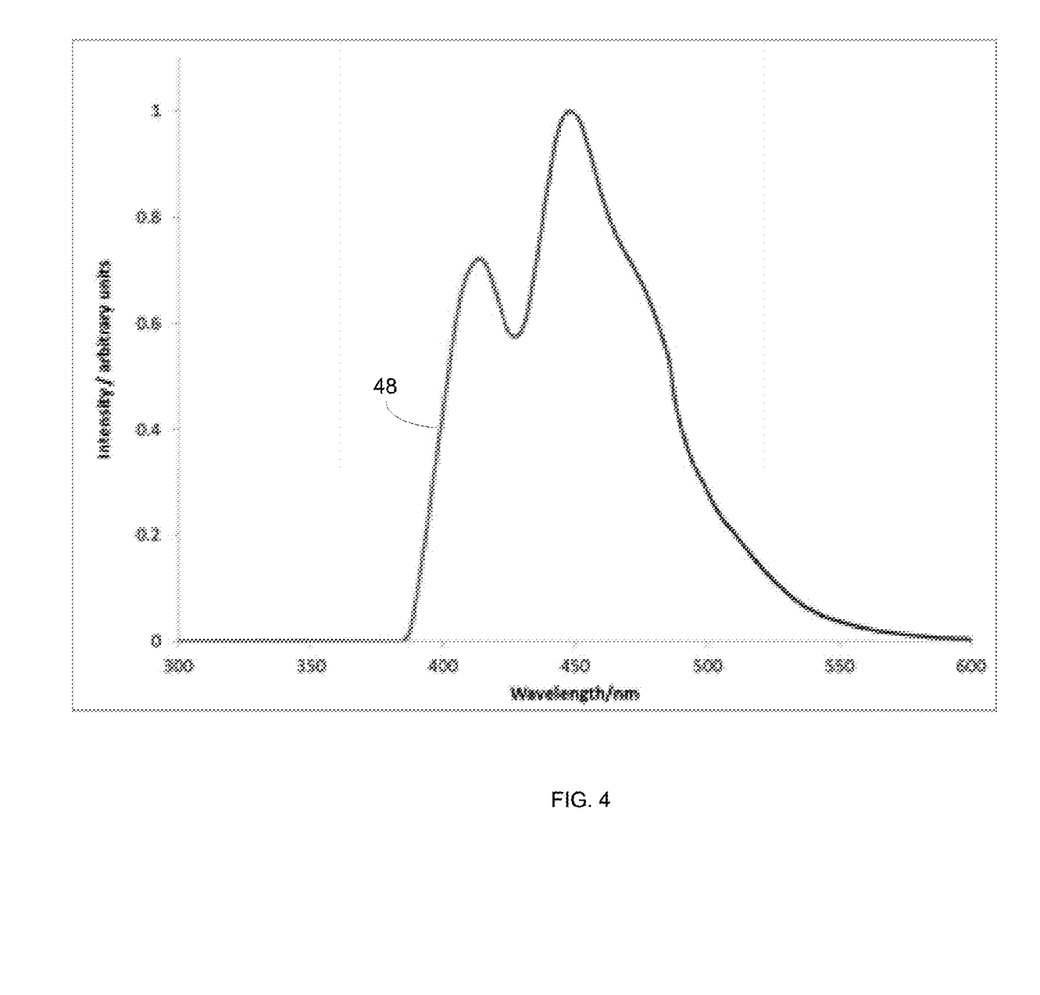
FIG. 4 is a graph showing the relative intensity of light reflected and emitted by the bird anti-collision film when the wavelength of the incident light is 410 nm.

FIG. 4 shows results of 410 nm light striking the front side of a window with the anti-collision film 10 affixed to the back side of the window. The horizontal axis represents light wavelengths and the vertical axis represents relative measured light intensity, The peak at 410 nm in curve 48 is the result of incident light reflecting off the surface of the glass and the peak at 440 nm is the result of light emitted by anti-collision film 10. Curve 48 shows that the anti-collision film radiates more light back o at 450 nm than the amount of light reflected back from the window at 400 nm. Thus, fluorescence from the anti-collision film substantially disrupts reflections viewable by birds.

Figure 5:
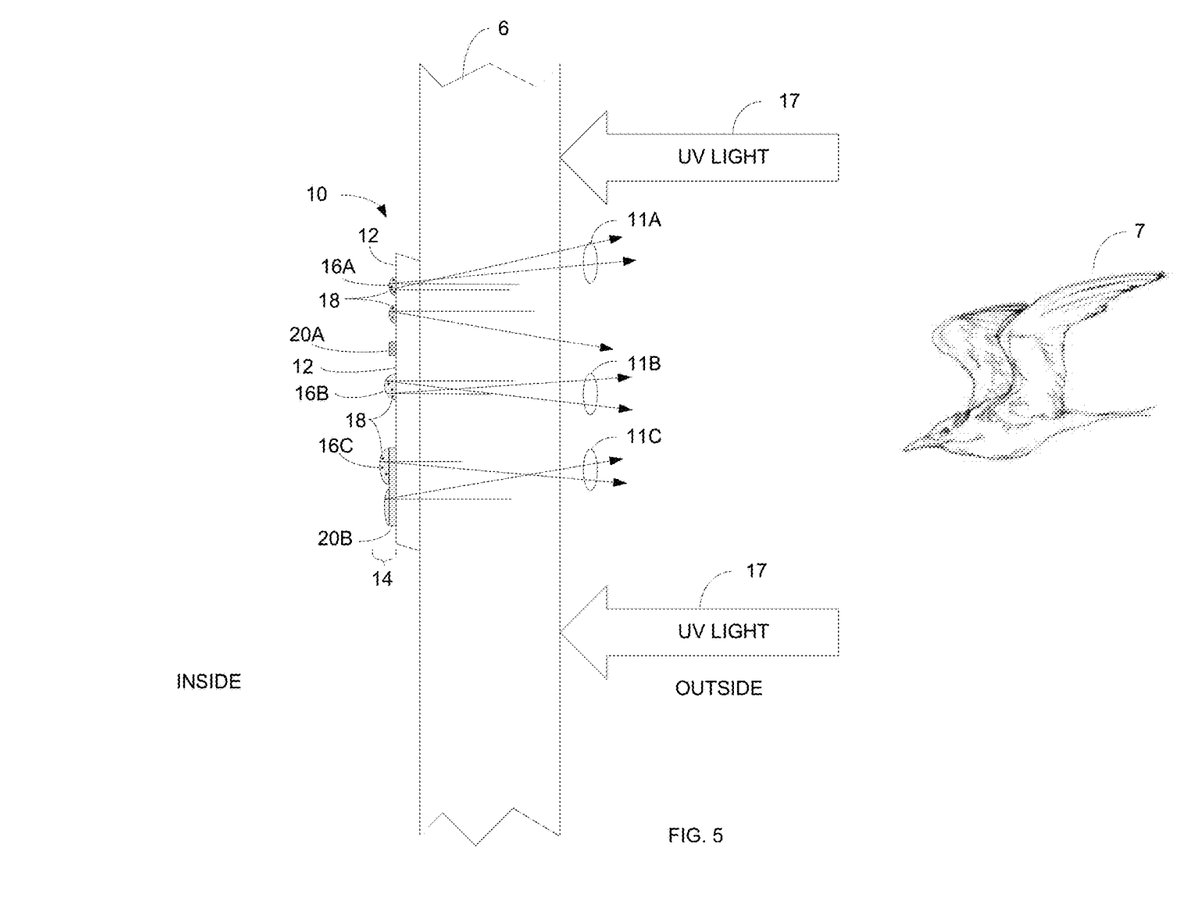
FIG. 5 is another side sectional view of the bird anti-collision window film.

FIG. 5 shows the cross-section of anti-collision film 10 in more detail. Bumps 16A, 16B, and 16C may form separate line patterns on base layer 12. The line patterns may form separate rows, columns, circles, curves, squares, or any other shape. The line patterns formed by bumps 16A, 16B, and 16C are spaced apart by substantially flat surfaces of layer 12. The spaced apart line patterns may create separate discontinuous light groups 11A, 11B, and 11C that further disrupt any images normally reflected by window 6.

Different ink layers 20A and 20B may be printed onto base layer 12 and/or textured layer 14 to further disrupt visual reflections from window 6. For example, ink layer 20A is printed onto a portion of base layer 12 with no textured layer 14 and ink layer 20B is printed onto another portion abase layer 12 underneath textured layer 14. In another example, ink layers 20 may he printed over both textured layer 14 and base layer 12 In other examples, ink may be mixed into the resin of base layer 12 ant or textured layer 14. Ink layers 20 may form any combination of colors and/or patterns and may create additional discontinuities in reflected and refracted light 11.

In one example, UV absorbing inhibitors are mixed into or printed onto base layer 12 or ink layers 20. The amount of UV inhibitors may be restricted to some optimal amount that enables fluorescent dye 18 to absorb substantial UV light within a first bird visible light range and then fluoresce at a substantial intensity at a second light range. In one example, it was discovered that res ling UV inhibitors in anti-collision film 10 to around 35%-45% of UV light create substantial fluorescence from fluorescent dye 18.

Figure 6A:
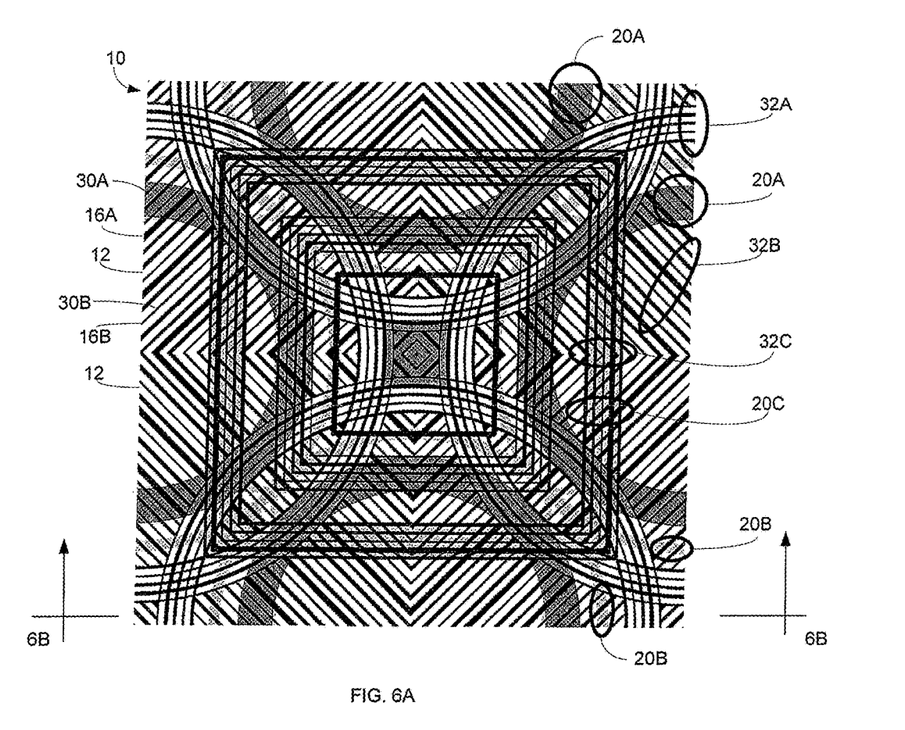
FIG. 6A is a front view of a line pattern used in the bird anti-collision window film.
Figure 6B:
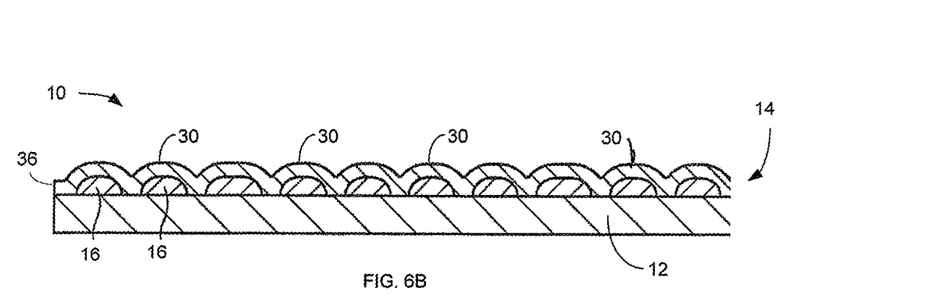
FIG. 6B is a side sectional view of the bird anti-collision window film.

FIG. 6A shows one example of textured lines 30 formed in bird anti-collision film 10. White spaces in FIG. 6A represent a top surface of base layer 12 and black lines 30 represent lines of bumps 16 formed in textured layer 14 on top of base layer 12. FIG. 6B shows a cross-section of anti-collision film 10 in FIG. 6A.

Lines 30 on layer 12 are formed into different widths, shapes, and patterns. For example, a series of bumps 16A may form a relatively wide first line 30A on base layer 12 and a second series of bumps 16B may form a relatively narrow line 30B on base layer 12. In one example, some of lines 30 form curved semi-circular patterns 32A of varying radiuses and orientations. Other lines 30 form square patterns 32B of varying sizes. Other fines 30 may form square patterns 32C of varying line widths and sizes oriented 90 degrees from square patterns 32B. These of course are just examples of any combination of raised textured line patterns that may be formed on base layer 12.

Different ink layers 20 are printed with different patterns on base layer 12. For example, a first blue ink layer 20A is printed in semi-circular patterns in different orientations on layer 12. A second yellow ink layer 20B is printed in semi-circular patterns in different orientations on layer 12. Another yellow ink layer 20C is printed in a square pattern underneath and matching textured square pattern 32C. These of course are also just examples of any combination of ink layers 20 and colors that can be printed in any combination of patterns on base layer 12 and/or textured layer 14.

Ink layers 20 may be printed on any combination of layers 12 and 14. For example, a first ink layer 20 may be printed on base layer 12, a second link layer 20 may be printed over both textured layer 14 and base layer 12, and a third color may be added as a pigment to base layer 12 or textured layer 14.

Textured spaced apart lines 30 increase discontinuities between radiating and non-radiating sections of light absorbed and emitted by film 10. As mentioned above, the white areas in FIG. 6A represent base layer 12 and may include a UV absorbing material and the black lines 30 represent textured layer 14 and may include a UV fluorescent dye. In another example, some of ink layers 20 may include a UV absorbing material or fluorescent dye. The UV absorption by base layer 12 and/or ink layer 20 in combination with the light absorption and subsequent fluorescence by fluorescent dye in textured layer 14 may further increase optical discontinuities in the light reflected, absorbed and emitted by anti-collision film 10.

Ink layers 20 may use a dichroic pigment to create prismatic disruptions. For example, one of ink layers 20 may appear as a rose color when viewing film 10 from a first angle outside of a window and the same ink layer 20 may appear as a more cayenne color when viewing anti-collision film 10 from a different angle outside of the window.

Figure 7:
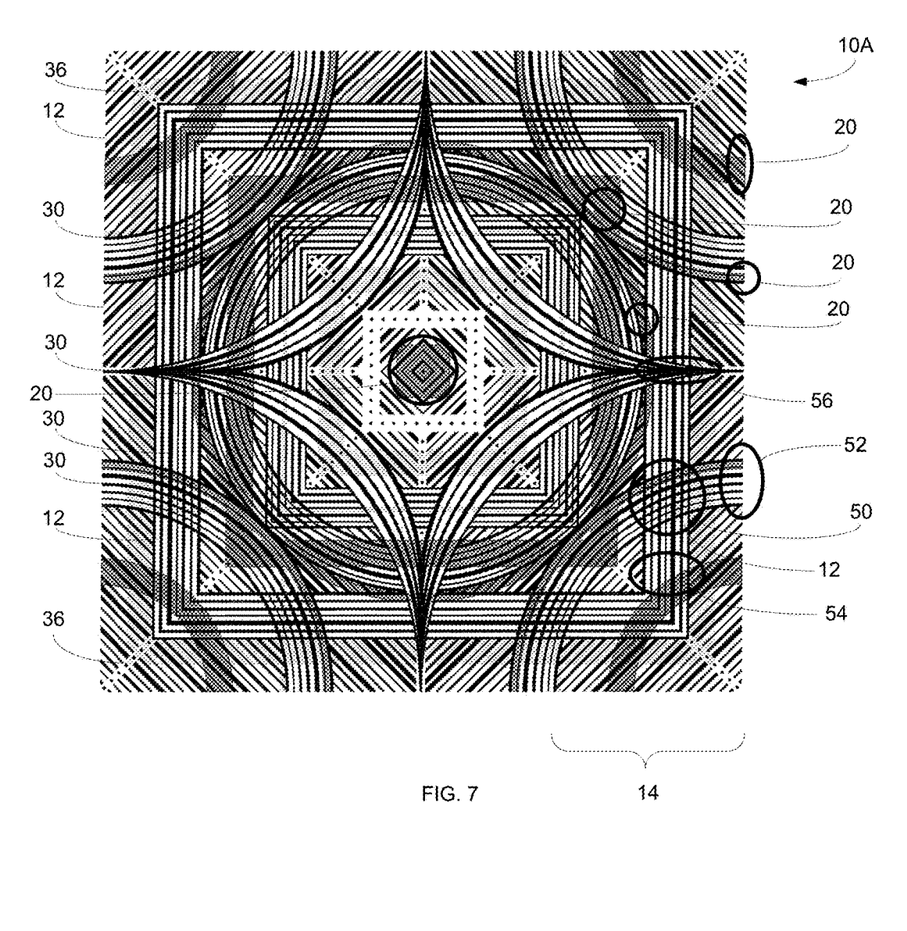
FIG. 7 is a front view of another line pattern used in the bird anti-collision window film.

FIG. 7 shows another bird anti-collision film 10A that uses different line patterns. Lines 30 and dots 36 are again formed in textured layer 14 on top of a polymeric film base layer 12 similar to film 10 in FIGS. 6A and 6B. Ink layers 20 may include other combinations of colors and/or patterns.

It was discovered that certain areas within anti-collision film 10A may fluoresce more than other areas. For example, a cross-hatched textured area 50 formed by intersecting curved lines 52 and straight lines 54 may fluoresce more than a substantially solid textured area 56. Areas 50 and 56 in textured layer 14 may have equivalent amount of fluorescent dye. However, it is believed that spaces between lines 52 and 54 formed by base layer 12 may enable the fluorescent dye in area 50 to absorb more UV light than solid textured area 56 (see FIG. 2). Thus, even though area 56 may have the equivalent or more fluorescent dye per square millimeter than area 50, the unique combination of multiple spaced apart raised rounded surfaces formed by lines 52 and 54 may produce more fluorescence.

The different three-dimensional shapes formed by textured lines 30 are believed to create a lens-like effect that magnifies the reflected and emitted light in a wider pattern more disruptive to reflections observable by birds. The different optical properties of texture layer 14 combined with the fluorescence produced by the fluorescent dye create additional visual disruptions further reducing bird collisions.

Multi-Layer Screen Process

One example uses a r screen printing process commonly known as screen printing for creating bird anti-collision film 10. While a screen printing process is described below, it should be understood that any other screen or non-screen process can be used that produce a textured surface on a window film.

Figure 8:
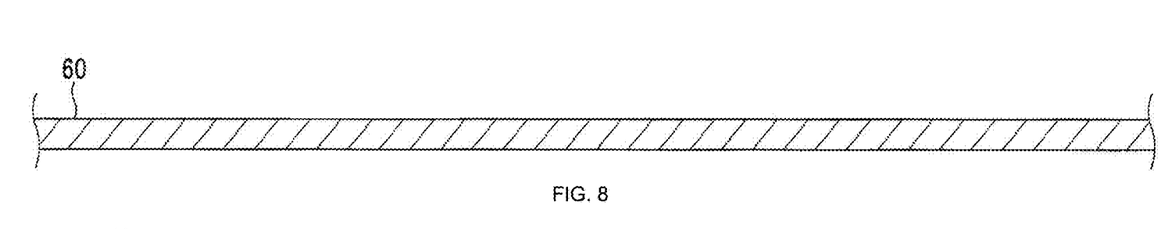
FIGS. 8-10 show screen printing stages used for creating the bird anti-collision window film.

FIG. 8 shows a polymeric film 60 used as a substrate for the screen printing process. In one example, polymeric film comprises non-textured base layer 12 described above and can be any type of translucent, transparent, or clear material that can be attached to a window. In one example, polymeric film 60 is a polyvinyl material that attaches to a window using cohesion and atmospheric pressure. Polymeric film 60 can be any thickness but in one example is anywhere between 0.5 thousands of an inch (mils) and 10 mils. In embodiment, polymeric film 60 is transparent and in other embodiments film 60 may be colored or have varying degrees of opaqueness as described above.

Figure 9:
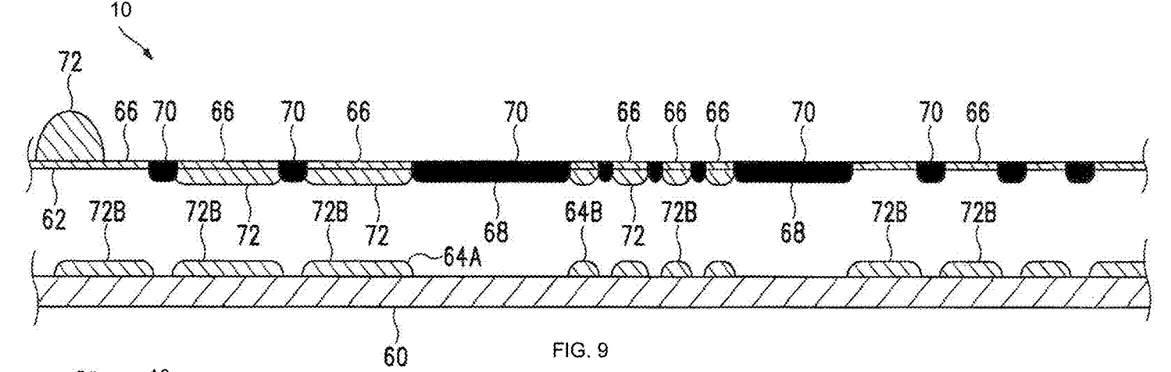

FIG. 9 shows a first stage of the screen printing process. A screen 62 is used to print a first resin layer 72B on top of polymeric film 60. A pattern is formed in areas 66 in one example using a photosensitive emulsion 68 that is applied as either a liquid coating or in sheet form. A pattern is applied over emulsion 68 and emulsion 68 is then exposed to light. For example, one of the patterns shown in FIGS. 6 or 7 may be applied over emulsion 68. The areas in emulsion 68 that were covered by the pattern remain soft and are washed out forming open areas 66. Areas 70 not covered by the pattern remain blocked off with emulsion 68.

In a next process, screen 62 is located over polymeric film 60 and a resin material 72 is spread over screen 62. Using a squeegee, resin 72 is spread through unblocked areas 66 in screen 62 and onto the top surface of polymeric film 60 forming resin layer 72B. Resin layer 72B forms textured layer 14 and associated bumps 16 and lines 30 described above. In one example, resin material 72 may include fluorescent dyes 18 described above. In other examples resin material 72 is clear or includes other degrees of opaqueness or color.

The size and shape of individual areas 66 can be relatively consistent or can vary in shape, size or spacing as shown above in FIGS. 6 and 7. If areas 66 have different shapes, then the corresponding bumps 64A and 64B and associated lines 30 formed in resin layer 72B will also have different shapes and sizes. For example, areas 66 and bumps 64A and 64B may form both areas 50 and 56 shown FIG. 7. As noted above, the variable size and shape of the bumps 64A and 64B formed in resin layer 72B in combination with spaced areas 66 may produce effective optical properties as well as the absorption and resulting emission of light.

In one embodiment, screen 62 has a thread count in the range of between 65-420 threads per inch and the thickness of the photosensitive emulsion 68 used to coat screen 62 is anywhere between 1 mil-100 mils. But in the example in FIG. 9, screen 62 is coated with emulsion 68 to a depth of about 6.0-8.5 mils. The range of 6.0-8.5 mils of emulsion 68 produces a thickness for resin layer 72B of around 1.0-5.5 mils.

In one example, resin 72 uses acrylated oligomers by weight in a range of about 20-55%, N-Vinyl-2 Pyrrolidone by weight of about 12-25%, and acrylated monomers by weight of about 8-20%. Resin 72 may contain similar elastic and pliability characteristic as polymeric film 60. This increases the ease in which film 10 can be applied to a window while also increasing durability. Of course this is only one example and other types of resin materials can also be used. The specific dimensions and materials used can be changed to created different lighting and application characteristics.

As mentioned above, 2%-15% by weight of textured layer 72B may include a fluorescent dye. Textured layer 72B with the fluorescent dyes reflects, and/or bends incoming light 17 so that the outgoing light 11 distorts reflected images.

Figure 10:
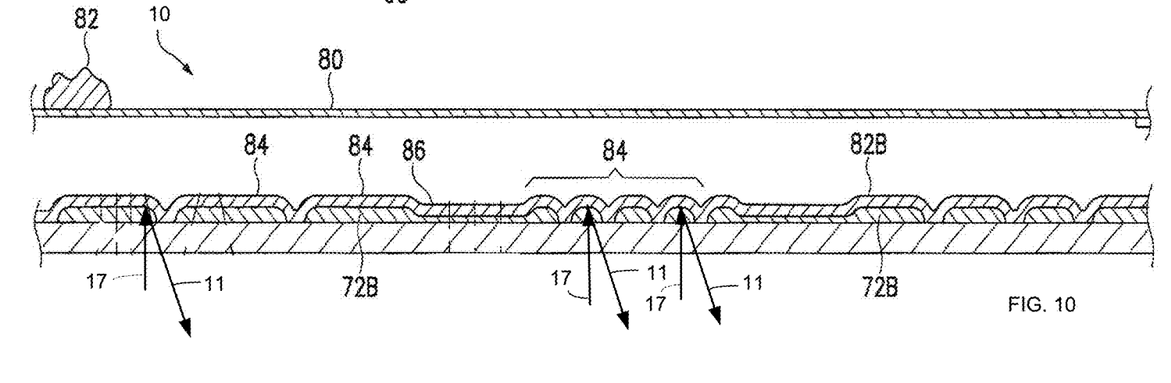

FIG. 10 shows a second screening process applied to anti-collision fill 10. A second screen 80, similar to screen 62 in FIG. 9, is used except screen 80 does not have a pattern formed from emulsion. In one example, screen 80 comprises a uniform mesh of between about 110-420 threads per inch and is large enough to cover the entire resin layer 72B. A second resin, clear varnish or clear coat 82 is spread over screen 80 applying a second substantially even resin layer 82B over first resin layer 72B.

Second resin layer 82B in one embodiment may be less viscous than the first resin layer 72B and may comprise a mixture of TRPGDA by weight in a range of about 20-25%, epoxy acrylate by weight in a range of about 50-56%, HDOCA by weight in a range of about 18-22%, and photoinitiators by weight in a range of about 3-5%. Of course other materials ca also be used to form the second resin layer 82B. In one example, resin layer 82B also may include a UV inhibitor. However, as explained above, the UV inhibitor may be limited to something less than 40% to optimize fluorescence by the fluorescent dye.

Color

Figure 11:
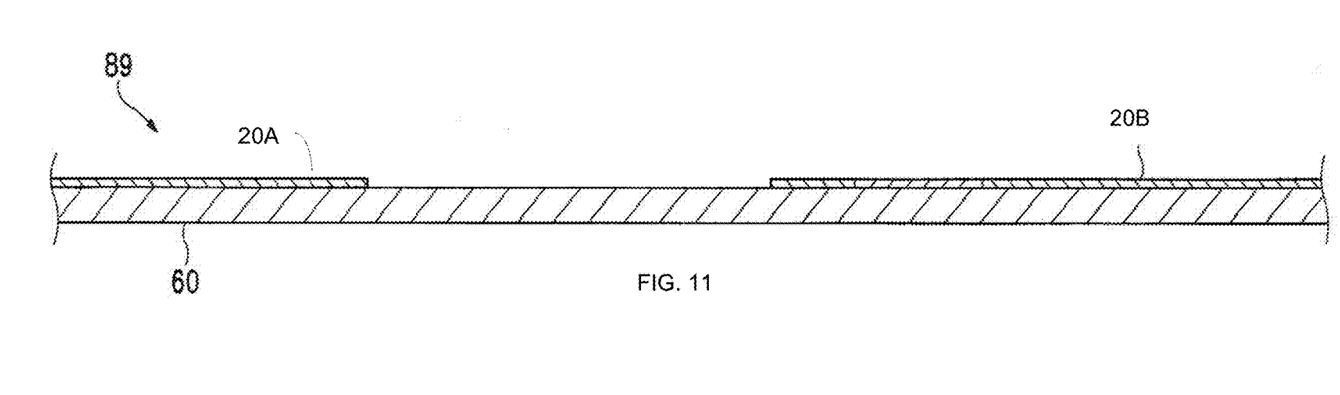
FIGS. 11 and 12 show screen printing stages used for a colored bird anti-collision window film.

FIG. 11 shows one example Where ink layers 20A and 20B are applied to a top surface of polymeric film 60. One example uses an offset lithography process to form ink layers 20. However, any other process can also be used to apply ink layers 20 on the polymeric film 60, such as by using an ink jet printing process or a screen printing process similar to that used for applying the resin layers.

In one example, ink used to form ink layer 20 is made of an elastic material that has similar elastic characteristics as the polymeric layer 60 and the resin layers 72B and 82B. The elastic characteristics of ink layers 20 make it more resistant to cracking. Ink layers 20 are optional and other embodiments of the textured window film, such as the textured window film 10 described above in FIGS. 8-10, ay not use ink layer 90.

One example of an ink material as described above includes 10-30% by weight Triacrylate Monomer; 10-30% by weight Acrylate Oligomer; 1-5% by weight Hydroxycyclohccyl, 1-,Phenyl Kclone; 1-5% by weight 1-Propanone, 2-methyl-1[4-(methylthio)phenyl]-2-(4-morpholinyl)-; 1-5% by weight Photoinitiator; and 1-5% by weight Pentacrythritol Tetraacrylate made by INX International Ink Co., 651 Bonnie Lane, Elk Grove Village, Ill. 60007.

Another ink material uses Monomeric Multifunctional Acrylates; Multi-Functional Acrylate Ester; Benzophenone; Acrylate Ester of Bisphenol-A-Epoxy; Multifunctional Acrylate; Isopropyl Alcohol; Inorganic filler; and Ketone type photo-initiator. Of course are just examples and other types of ink materials could also be used.

Figure 12:
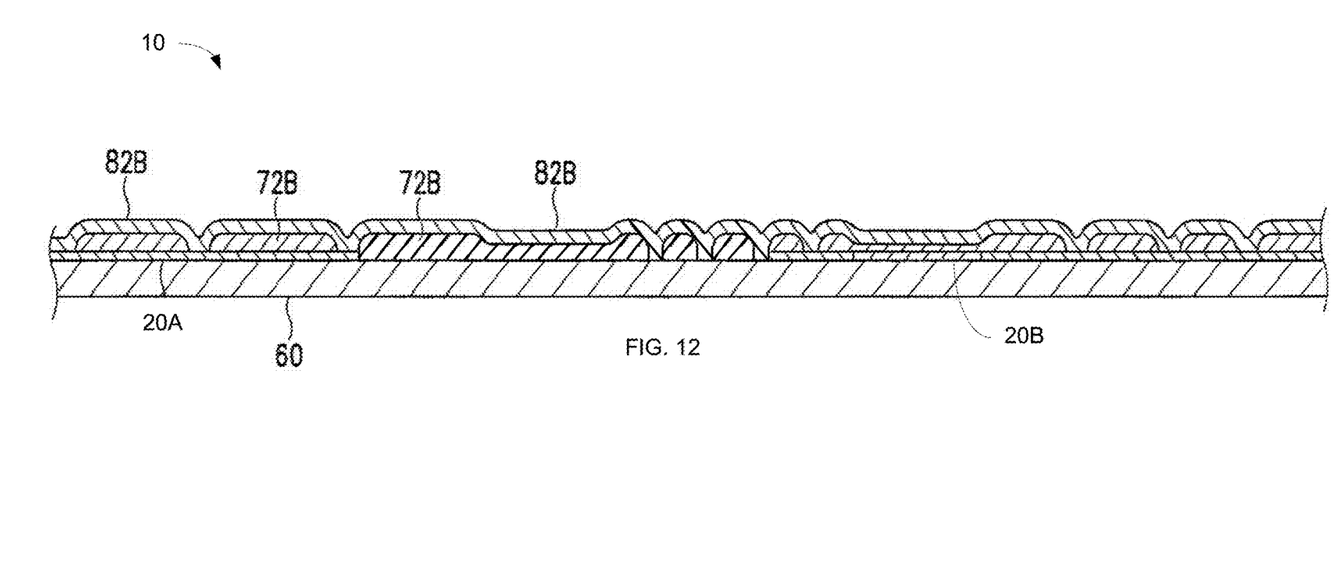

FIG. 12 shows resin layers 72B and 82B applied on top of ink layers 20A and 20B. Resin layers 72B and 82B are applied in the same manner described above in FIGS. 8-10. In one example ink layers 20A and 20B may have different colors and shapes and may use different dichroic pigments and/or UV inhibitors. In another example, polymeric layer 60, resin layer 72B, and/or resin layer 82B also may include UV absorbing inhibitors.

The processes described above are only examples of a combination of textures that are created on the polymeric film. It should also be understood that limitless combinations of screens, emulsion and resin materials can be used to create different textured surfaces. For example, the different patterns on the screen meshes, the thread counts (mesh count) on the screen meshes and the thickness of the emulsions and resins applied to the screens can all be varied to create different textured line patterns with different thicknesses and shapes.

A screen with a lower thread count per inch produces a coarser mesh that allows more of the resin to pass through onto the polymeric substrate. This can produce different shapes and heights of the bumps and line patterns on the textured surface. In one example, if was discovered that bumps with a height of around $4/1000^{th}$ of an inch (4 mils) produced a highly effective light disturbance. These different bump and line heights in combination with the textured surface pattern and any ink pattern applied during the process can create a limitless combination of reflection and refraction characteristics.

Installation

Another advantage of the process described above is the ease that the anti-collision film 10 can be applied to and removed from the inside of a window. For example, the smooth/flat contact of polymeric film 60 allows the anti-collision film 10 to be applied without the use of adhesive materials. Anti-collision film 10 is held to the window surface by cohesion and atmospheric pressure. While this is one embodiment, other embodiments of anti-collision film 10 can apply an adhesive material to the window contact surface.

Anti-collision film 10 in one embodiment s thicker than conventional widow films. This makes film 10 more resilient to bending and creasing and in general makes the material easier to work with. The polymeric substrate and resin layers in combination with any applied ink also have a flexible and stretchable characteristic that further prevent film 10 from cracking and otherwise being damaged during application or removal from a window. The materials described above for forming anti-collision film 10 also do not require any special cleaning process. Thus, conventional window cleaners can be used.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A bird anti-collision film, comprising:
   a polymeric film having a first side configured to attach to a window;
   a discontinuous textured layer forming a raised surface on a second side of the polymeric film and exposing a portion of the polymeric film, the textured layer configured to disrupt reflections of habitat from the window; and
   a fluorescent dye mixed into only the textured layer that absorbs a first light wavelength range substantially detectable by birds and substantially undetectable by humans and fluoresces at a second light wavelength range substantially detectable by birds and only partially detectable by humans,
   wherein the textured layer forms spaced apart raised rounded line patterns in a cross-hatched textured pattern on the polymeric film configured to absorb the first light wavelength range and radiate out the second light wavelength range from a substantially flat front surface and rounded side and back surfaces.

2. The bird anti-collision window film of claim 1, including an ink layer applied over the polymeric film and/or the textured layer.

3. The bird anti-collision window film of claim 1, wherein the each of the line patterns is configured to separately absorb the first light wavelength range and fluoresce the second light wavelength range.

4. The bird anti-collision window film of claim 1, wherein the line patterns include square line patterns of varying widths, sizes, and orientations.

5. The bird anti-collision window film of claim 4, wherein the line patterns include semi-circular line patterns of varying widths, sizes, and orientations.

6. The bird anti-collision window film of claim 1, including an ink layer with a shape matching at least some of the line patterns.

7. The bird anti-collision window film of claim 1, wherein the fluorescent dye is between 2%-15% by weight for a resin used for forming the textured layer.

8. A bird anti-collision film, comprising:
a plurality of layers including a polymeric film having a first side configured to attach to a window, and a second layer; and
a fluorescent dye that absorbs a first light wavelength range substantially detectable by birds and substantially undetectable by humans, and fluoresces at a second light wavelength range substantially detectable by birds and only partially detectable by humans;
wherein the polymeric film has a planar side opposite the first side and wherein the second layer comprises a discontinuous textured layer having a first planar side and second non-planar side comprising a curved or partially rounded surface opposite the first planar side;
wherein the first planar side of the second layer contacts the planar side of the polymeric film; and
wherein the fluorescent dye is mixed into only the second layer.

9. The bird anti-collision window film of claim 8, wherein a peak excitation value for the first light wavelength range is centered around 410 nanometers and a peak emission intensity value for the second wavelength range is centered around 450 nanometers.

10. The bird anti-collision window film of claim 8, wherein the second layer comprises bumps that form spaced-apart raised line patterns.

11. The bird anti-collision window film of claim 10, wherein the line patterns form different square and curved shapes with different orientations configured to absorb the first wavelength range and fluoresce the second wavelength range.

12. The bird anti-collision film of claim 8, further comprising an additional layer.

13. The bird anti-collision film of claim 12, wherein the surface of at least one of the second layer or the additional layer is non-planar.

14. The bird anti-collision window film of claim 8, wherein the side of the second layer comprises a first side of the second layer, and wherein the second layer has a second side opposite the first side, with surface area that is greater than the first side.

15. A bird anti-collision film, comprising:
a plurality of layers including a first layer and a second layer; and
a fluorescent dye that absorbs a first light wavelength range substantially detectable by birds and substantially undetectable by humans, and fluoresces at a second light wavelength range substantially detectable by birds and only partially detectable by humans;
wherein the first layer comprises a vinyl film having a first side configured to attach to a window, and a second planar side opposite the first side;
wherein the second layer comprises a discontinuous textured layer having a first planar side and a second side opposite the first planar side, the textured layer comprising a pattern of bumps or protuberances;
wherein the first planar side of the second layer contacts the second planar side of the first layer and is configured to expose a portion of the first layer; and
wherein the fluorescent dye is mixed into only the second layer.

16. The bird anti-collision film of claim 15, wherein a peak excitation value for the first light wavelength range is centered around 410 nanometers and a peak emission intensity value for the second wavelength range is centered around 450 nanometers.

17. The bird anti-collision film of claim 15, wherein the pattern of bumps or protuberances form spaced-apart raised line patterns.

18. The bird anti-collision film of claim 17, wherein the line patterns include square lines of varying diameters and orientations, curved lines of varying diameters and orientations, or a combination of both.

19. The bird anti-collision film of claim 17, wherein the each of the line patterns is configured to separately absorb the first wavelength range and emit light at the second wavelength range from both a substantially flat front surface and substantially rounded side and back surfaces.

20. The bird anti-collision film of claim 17, including an ink layer with a same shape as some of the line patterns.

21. The bird anti-collision film of claim 15, wherein the fluorescent dye is between 2%-15% by weight of a resin used for forming the second layer.

22. The bird anti-collision film of claim 15, further comprising an additional layer.

23. The bird anti-collision film of claim 22, wherein the surface of at least one of the second layer or the additional layer is non-planar.

24. The bird anti-collision film of claim 8, wherein the fluorescent dye is between 2%-15% by weight of a resin used for forming the second layer.

25. The bird anti-collision film of claim 10, including an ink layer with a shape matching at least some of the line patterns.

* * * * *